United States Patent [19]

Morlock

[11] 4,153,114
[45] May 8, 1979

[54] ROCK PICKER WITH KICKER ROLLER

[75] Inventor: Reuben D. Morlock, Jamestown, N. Dak.

[73] Assignee: Haybuster Mfg. Inc., Jamestown, N. Dak.

[21] Appl. No.: 819,135

[22] Filed: Jul. 26, 1977

[51] Int. Cl.² .............................................. A01B 43/00
[52] U.S. Cl. ...................................... 171/65; 56/328 R
[58] Field of Search ....................................... 171/63–65, 171/101, 115; 56/328 R

[56] References Cited
U.S. PATENT DOCUMENTS 4,029,151  6/1977  Hehr ........................................ 171/65

Primary Examiner—Russell R. Kinsey

[57] ABSTRACT

A mobile frame is provided including a frusto-conical ground wheel journaled for rotation about a generally horizontal but inclined transverse axis with the lowermost slant height of the wheel disposed for surface-to-surface contact with the ground over which the frame is advanced. The wheel includes a central body occupying the central portion of the interior thereof thereby limiting the useful volume of the interior of the wheel to an outer circumferential area thereof and stone deflecting structure is provided for deflecting stones lying on the ground into the lower periphery of the outer circumferential interior area of the wheel through the open side thereof. The body includes a plurality of radially outwardly facing relatively angulated sides spaced about the axis of rotation of the wheel and convergent toward the open end thereof. An inclined chute is supported in generally horizontal registry with the upper periphery of the body at the minor dimension end thereof adjacent the open side of the wheel and a driven fluted kicker roll is journaled outwardly of and extends along the outer end of the chute remote from the open end of the wheel for engaging stones passing from the interior of the wheel and being discharged downwardly therefrom along the chute. The engaged stones are then laterally discharged from the fluted roll into an upwardly opening receptacle disposed on the side of the roll remote from the chute.

18 Claims, 7 Drawing Figures

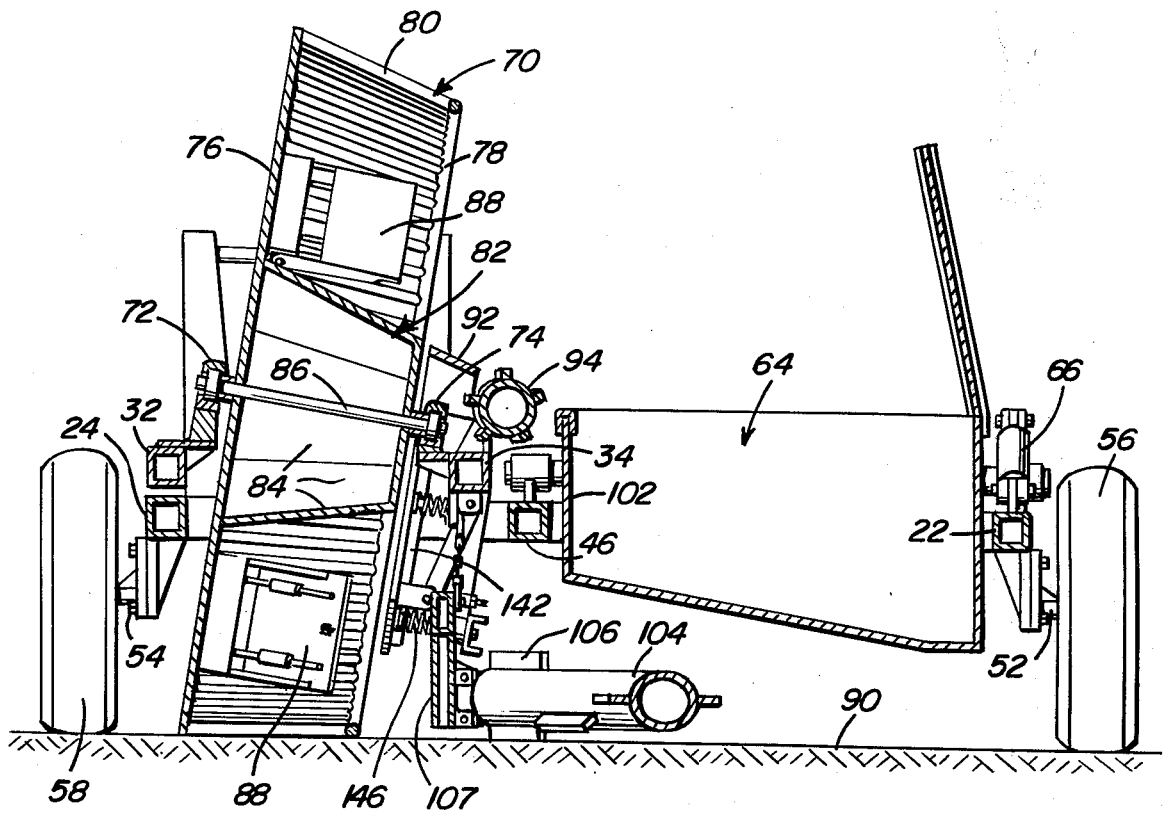
Fig. 3
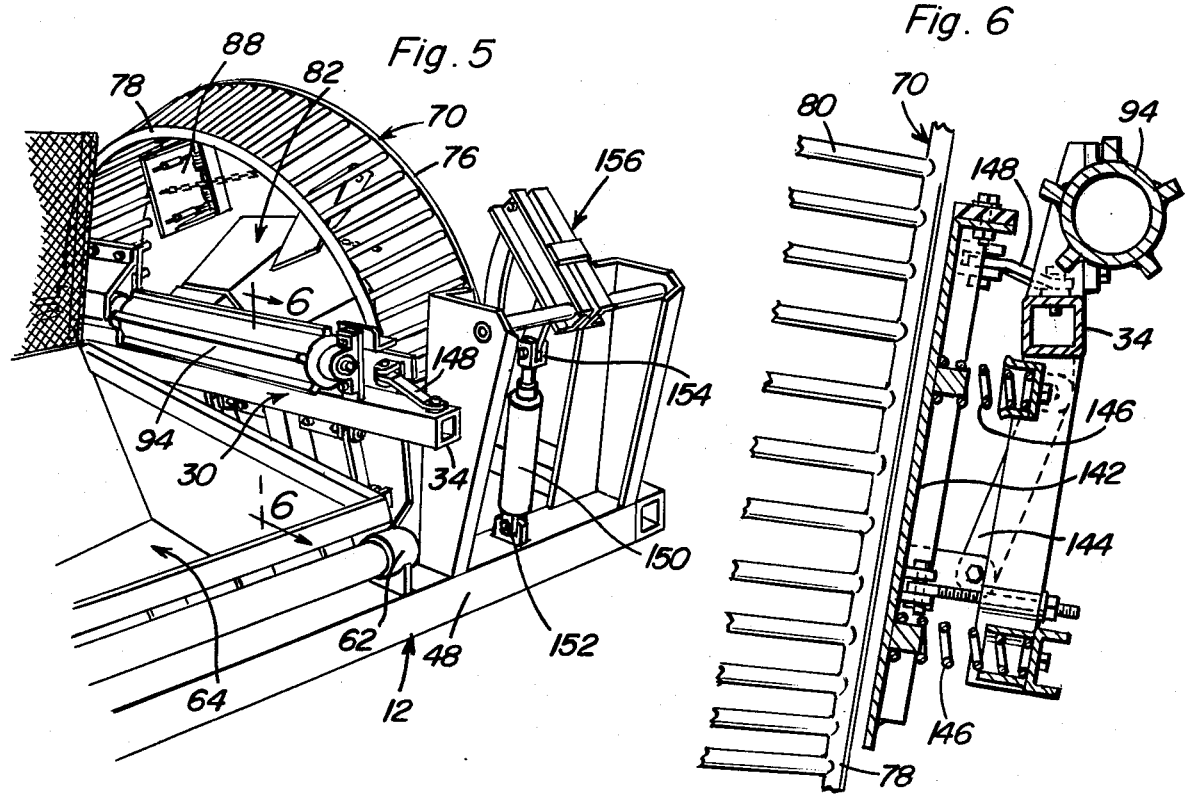
Fig. 5
Fig. 6

ROCK PICKER WITH KICKER ROLLER

BACKGROUND OF THE INVENTION

The rock picker of the instant invention comprises an improvement over the stone gatherers disclosed in U.S. Pat. Nos. 3,719,233 and 4,029,151. The rock picker includes structure whereby rocks and stones picked from the ground thereby may be more efficiently elevated to an elevated position and laterally discharged into a receptacle for receiving the rocks and stones.

BRIEF DESCRIPTION OF THE INVENTION

The rock picker of the instant invention includes an hollow truncated cone-shaped wheel for rolling along the ground and receiving stones and rocks deflected into the lower periphery of the open minor diameter end of the wheel and subsequently elevating the rocks and stones within the wheel, upon rotation of the latter, to a discharge point in the upper periphery of the wheel and thereafter freely discharging the rocks from the wheel through the open side thereof and into an upwardly opening receptacle disposed outwardly of the open side of the wheel.

The main object of this invention is to provide a rock picker which will be capable of efficiently picking and rocks and stones from the ground, elevating the picked rocks and stones to a predetermined elevated position and thereafter laterally discharging the elevated rocks and stones into an upwardly opening receptacle therefor.

Another object of this invention is to provide a rock picker wherein the upwardly opening receptacle for picked rocks is supported for shifting between an upwardly opening rock and stone receiving position to a rearwardly inclined rock and stone dumping position.

Yet another object of this invention is to provide a rock picker in accordance with the preceding objects and constructed in a manner whereby the rock and stone picking wheel and the discharge mechanisms for discharging rocks and stones from the wheel are all supported for simultaneous vertical adjustment relative to a wheeled main frame of the rock picker provided to support and guide the rock picker over the ground during a rock picking operation.

A final object of this invention to be specifically enumerated herein is to provide a rock picker in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged, transverse, vertical sectional view taken substantially upon the plane indicated by the section line 3—3 of FIG. 1;

FIG. 5 is a fragmentary, perspective view of the rock picker illustrating the upper portion of the open side of the large diameter hollow truncated con-shaped rock picking wheel, the fluted discharge roll and the upwardly opening receptacle of the rock picker;

FIG. 6 is an enlarged, fragmentary, vertical sectional view taken substantially upon the plane indicated by the section line 6—6 of FIG. 5.

DETAILED DESCRIPTION OF THE INVENTION

Figure 1:
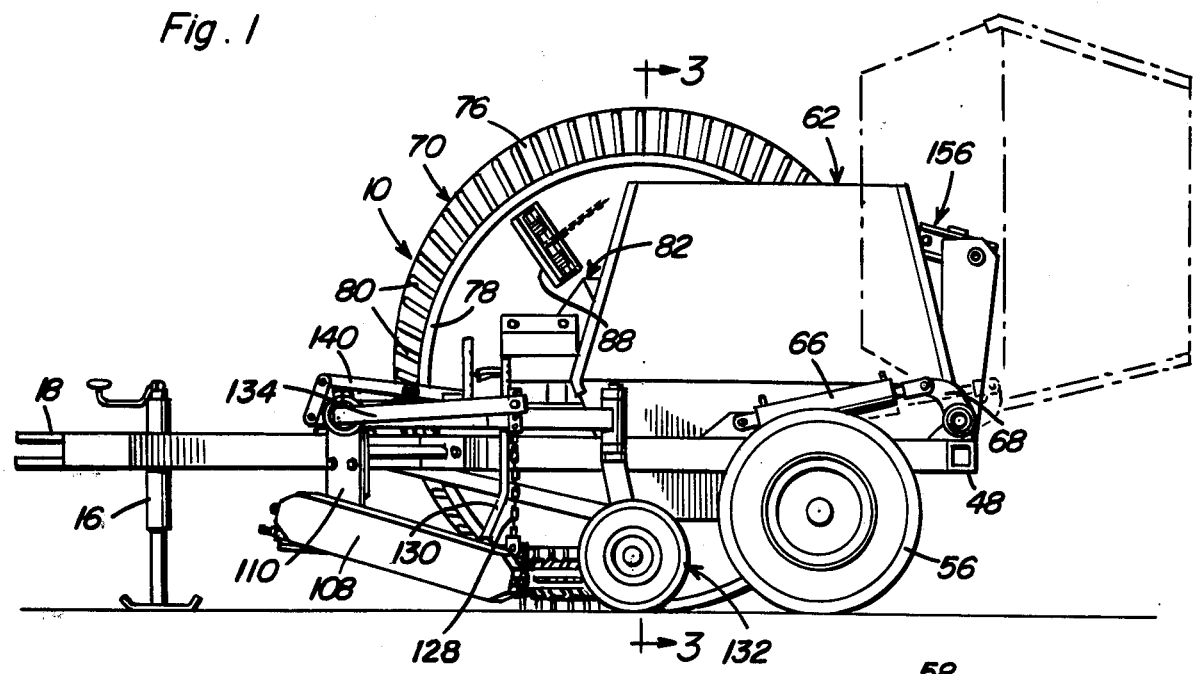
FIG. 1 is a side elevational view of the rock picker of the instant invention.
Figure 2:
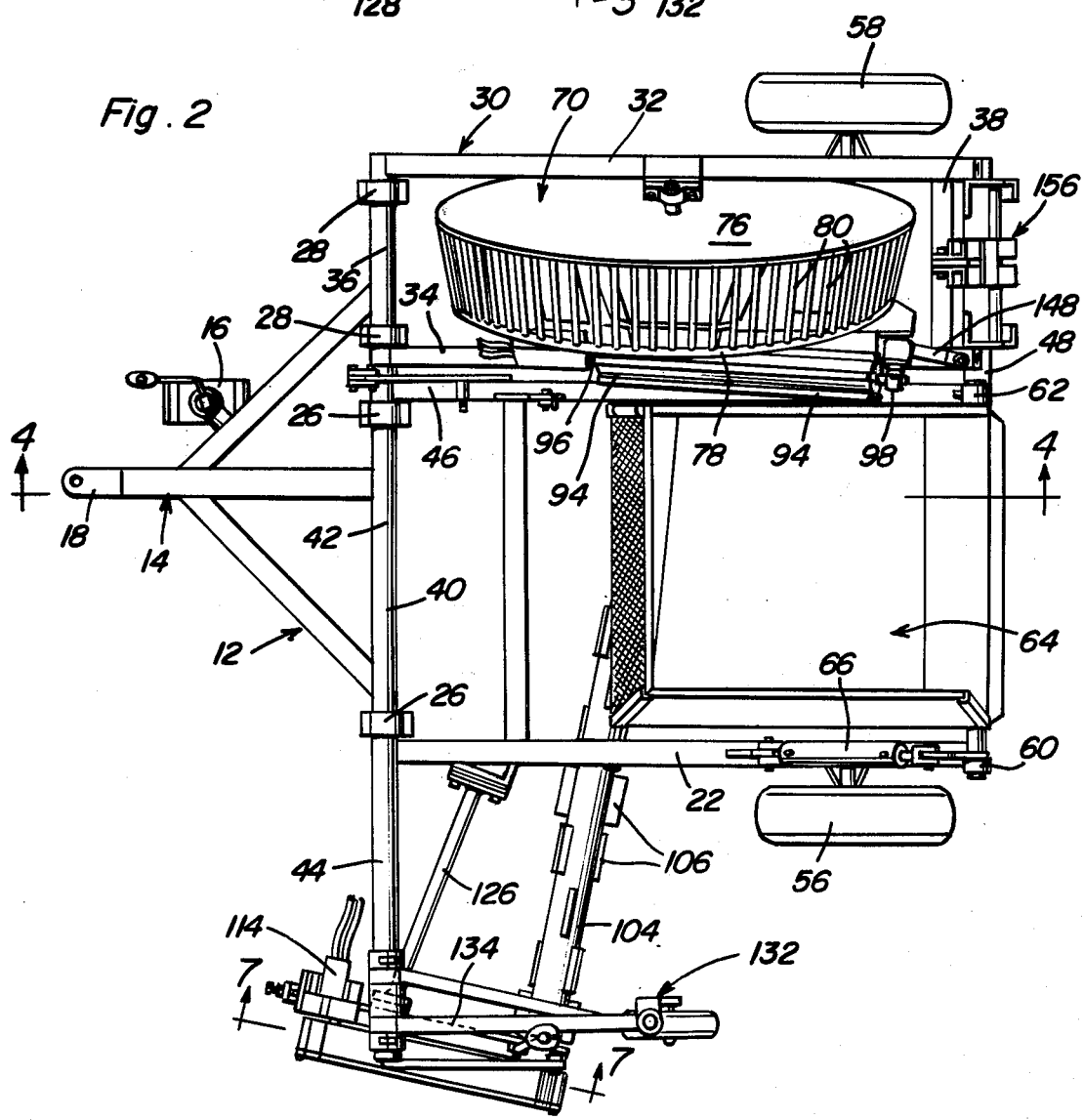
FIG. 2 is a top plan view of the assembly illustrated in FIG. 1.

Referring now more specifically to the drawings, the numeral 10 generally designates the rock picker of the instant invention. The picker 10 includes a main frame referred to in general by the reference numeral 12. The frame 12 includes a forwardly projecting tongue assembly referred to in general by the reference numeral 14 and including a manually operable jack assembly 16 for direct support of the tongue assembly 14 from the ground. The forward end of the tongue assembly 14 includes hitch structure 18 for connection to a draft vehicles.

The rear end of the tongue assembly 14 is anchored relative to a forward transverse member 20 of the main frame 12 and the main frame 12 includes a pair of opposite side longitudinal members 22 and 24 which project rearwardly from opposite end portions of the transverse member 20, the latter including pairs of journal blocks 26 and 28 supported therefrom.

The right side of the main frame 12 pivotally supports a sub-frame referred to in general by the reference numeral 30 therefrom. The sub-frame 30 includes opposite side longitudinal members 32 and 34 interconnected at their forward ends by means of a forward transverse member 36 and at their rear ends by means of a rear transverse member 38. The opposite end portions of the forward transverse member 36 are journaled in the journal blocks 28. Further, an elongated support arm 40 has one inner end portion 42 thereof oscillatably supported in the journal blocks 26 and the outer end portion 44 of the support arm 40 projects horizontally outwardly of the left side of the main frame 12.

The main frame 12 further includes an intermediate longitudinal member 46 secured at its forward end to the forward transverse member 20 and the rear ends of the longitudinal members 22, 24 and 46 are interconnected by means of a rear transverse member 48.

The rear end portions of the longitudinal members 22 and 24 support wheel spindle assemblies 52 and 54 therefrom having wheels 56 and 58 journaled thereon. In addition, the rear ends of the longitudinal members 22 and 46 include journals 60 and 62 from which the rear portion of an upwardly opening receptacle referred to in general by the reference numeral 64 is oscillatably supported for swinging movement between a rock receiving upwardly opening position and an upwardly and rearwardly swung and rearwardly opening dumping position, such as that illustrated by phantom lines in FIG. 1. A double-acting hydraulic cylinder 66 is operatively connected between the longitudinal member 22 of the main frame 12 and a crank arm 68 carried by the left hand side of the receptacle 64 whereby the cylinder or motor 66 may be operated to cause the receptacle 64 to swing between the solid and phantom line positions thereof illustrated in FIG. 1.

A large diameter hollow truncated cone-shaped wheel referred to in general by the reference numeral 70 is journaled from the sub-frame 30 as at 72 and 74 for rotation about an inclined axis extending transversely of the main frame 12 and inclined downwardly toward the minor diameter end of the wheel 70. The major diameter of the wheel 70 is closed by means of an end wall 76 and the minor diameter end of the wheel 70 is opened and is defined by a peripherally extending rim 78. The outer periphery of the wheel 70 is defined by circumferentially spaced bars 80 extending and secured between corresponding outer peripheral portions of the end wall 76 and the rim 78. The spacing between adjacent bars 80 define slots through which dirt and small pebbles may fall from within the interior of the wheel 70.

The central portion of the interior of the wheel 70 is occupied by a body referred to in general by reference numeral 82 supported from the end wall 76. The body 82 includes a plurality of planar interconnected panels 84 disposed about the center axial shaft 86 of the wheel 70 and the panels 84 are convergent toward the open end or side of the wheel 70 remote from the end wall 76 thereof. Accordingly, the body 82 is generally truncated cone-shaped in configuration. The body 82 occupies the center portion of the interior of the wheel 70 and thereby leaves only an outer peripheral portion of the interior of the wheel 70 open to receive rocks and stones therein. The interior of the wheel 70 includes peripherally spaced spring biased lifting panels 88 pivotally supported from the end wall 76 and the panels 88 are operative to engage and elevate rocks laterally deflected into the lower periphery of the interior of the wheel 70 as the latter rolls along the ground 90 from which the rock picker 10 is supported by means of the wheels 56 and 58.

A generally horizontal front to rear extending and transversely inclined chute 92 is supported from the longitudinal member 34 of the sub-frame 30 is disposed immediately outwardly of and in generally horizontal register with the upper periphery of the major dimension end of the body 82 at the open end of the wheel 70. The inclination of the chute 92 substantially corresponds to the inclination of the uppermost panel 84 and the chute 92 is coextensive therewith.

Figure 4:
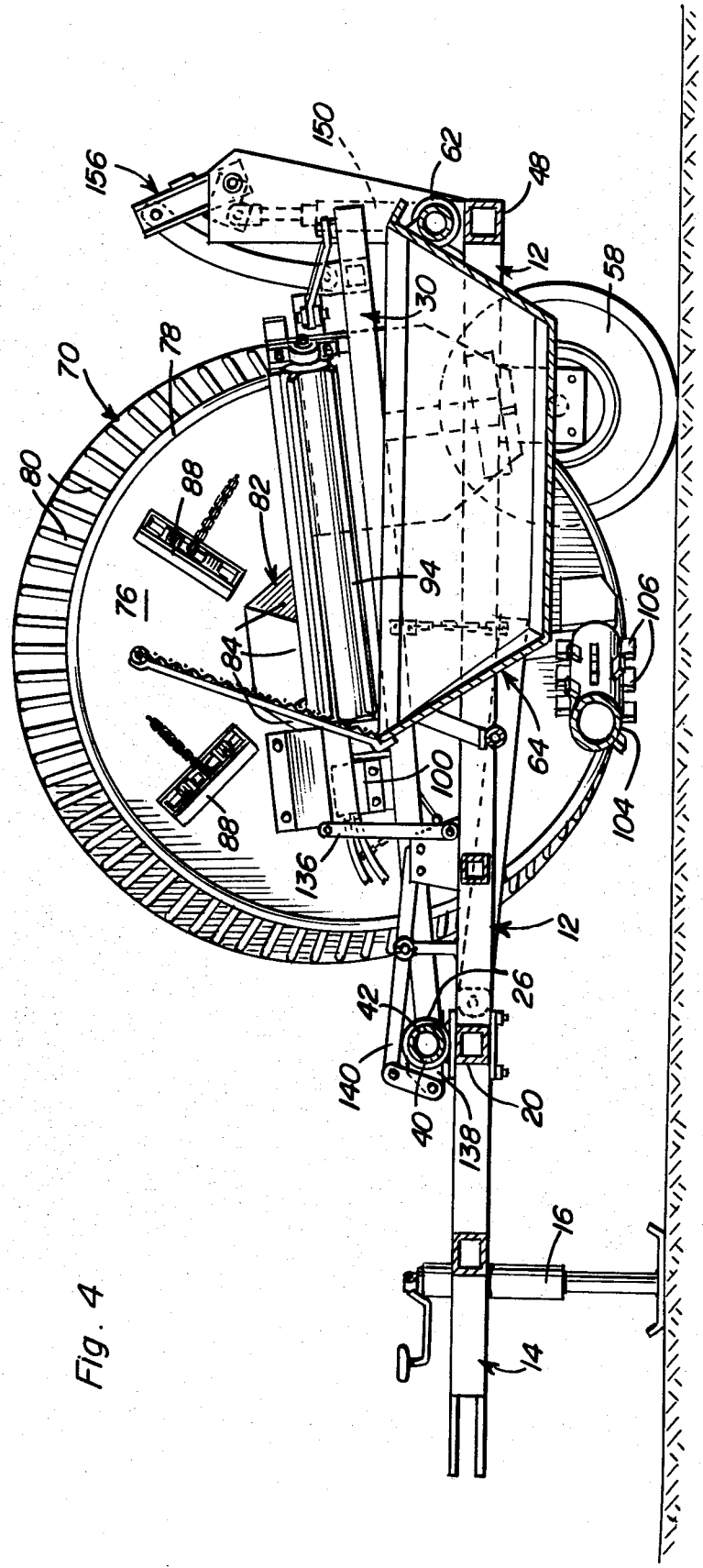
FIG. 4 is an enlarged, longitudinal, vertical sectional view taken substantially upon the plane indicated by the section line 4—4 of FIG. 2.
Figure 7:
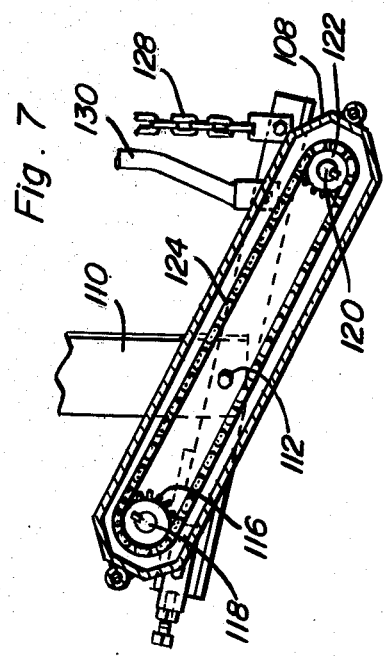
FIG. 7 is an enlarged, fragmentary, vertical sectional view taken substantially upon the plane indicated by the section line 7—7 of FIG. 2.

In addition, a longitudinally fluted kicker roll 94 is journaled on the longitudinal member 34 as at 96 and 98 and an orbit motor 100 (see FIG. 4) supported from the sub-frame 30 is drivingly connected to the roll 94 in order to rotate the latter in a clockwise direction as viewed in FIG. 3. The upper periphery of the roll 94 is generally horizontally registered with and disposed immediately outwardly of the lower discharge end of the chute 92 and the inner side wall 102 of the upwardly opening receptacle 64 is disposed immediately outwardly of the side of the roll 94 remote from the chute 92 for receiving stones and rocks laterally discharged from the right hand side of the roll 94.

An elongated roll 104 provided with longitudinally and circumferentially spaced elongated and longitudinally extending outwardly projecting flanges 106 has one end thereof journaled from a vertically adjustable support structure 107 supported from the longitudinal member 34 of the sub-frame 30 and the other end of the roll 104 is journaled from the rear end of an elongated support 108 rockably supported from a depending support member 110 carried by the outer end portion 44 of the support arm 40. The longitudinal midpoint of the support 108 is oscillatably supported from the lower end of the support member 110 as at 112 for oscillation about a horizontal transverse axis and an orbit motor 114 is supported from the forward end of the support 108 and has a sprocket wheel 116 mounted on its rotatable output shaft 118. The support 108 is hollow and the sprocket wheel 116 is enclosed within the forward end of the hollow support 108. The end of the roll 104 journaled from the rear end of the support 108 includes a shaft portion 120 which projects into the interior of the support 108 and has a sprocket wheel 122 mounted thereon aligned with the sprocket wheel 116. An endless chain 124 is trained about the sprocket wheels 116 and 122 and thereby drivingly connects the sprocket wheel 116 to the sprocket wheel 122 for rotation of the roll 104 in a clockwise direction as viewed in FIG. 4 of the drawings upon actuation of the orbit motor 114.

The support member 110 is braced relative to the main frame 12 by means of a bracing arm 126 extending and secured therebetween and the rear end of the support 108 includes supporting and adjustment structure 128 and 130 operatively connected between the rear end of the support and a ground engageable support wheel assembly referred to in general by the reference numeral 132 including a supporting trailing arm 134 whose forward end is mounted on the support arm 40 for oscillation therewith. A control lever 136 is pivotally supported from the longitudinal member 46 of the main frame 12 and is operatively connected to a crank arm 138 mounted on the inner end portion of the support arm 40 by means of a linkage assembly 140, see FIG. 4.

With attention now invited more specifically to FIGS. 3 and 6 of the drawings, a pressure plate 142 is spring supported from the longitudinal member 34 of the sub-frame 30 for guided movement between limit position toward and away from the open side or end of the wheel 70 from the exterior thereof. The pressure plate 142 is supported from the longitudinal member 34 by means of a pair of suspension links 144 and is spring biased toward its innermost limit position closely adjacent the open end of the wheel 70 by means of compression springs 146. In addition to the links 144, a link 148 is pivotally connected between the upper rear corner portion of the plate 142 and the rear end of the longitudinal member 34 of the sub-frame 30. The plate 142 opposes and substantially closes the lower rear quadrant of the open side of the wheel 70.

A hydraulic cylinder 150 is disposed in upstanding position and has its lower end oscillatably supported by the rear transverse member 48 of the main frame 12 as at 152. The upper end of the hydraulic cylinder 150 is operatively connected as at 154 to a linkage assembly referred to in general by the reference numeral 156 interconnected between the main frame 12 and the rear transverse member 38 of the sub-frame 30 in a manner such that extension of the fluid motor 150 will effect upward swinging of the rear end of the sub-frame 30 and contraction of the hydraulic cylinder will allow the lower periphery of the wheel 70 to rollingly engage the ground 90 and "float" over irregular ground surfaces, relative to the main frame 12, over which the rock picker 10 is being moved.

In operation, the roll 104 is inclined forwardly at its left end and is, therefore, operative to window rocks and stones lying on the ground in the path of the rock picker 10 inwardly along the roll 104 and into the lower periphery of the open end of the wheel 70. Then, as the wheel 70 rolls forwardly over the ground, the panels 88 engage the rocks and stones within the wheel 70 to elevate the rocks and stones to a position above and rearward of the body 82. Continued rotation of the wheel 70 then causes the elevated rocks and stones to fall from the panels onto the uppermost panel 84 of the body 82 whereupon the stones and rocks will slide down the uppermost panel 84 from the open side of the wheel 70 and onto the chute 92. As the stones and rocks slide down the chute 92 to the discharge end thereof, they are engaged by the fluted roll 94 and discharged into the upwardly opening receptacle 64 at an accelerated rate of speed.

After a predetermined quantity of rocks and stones have been received within the receptacle 64, the cylinder 66 may be actuated to effect swinging movement of the receptacle 64 to the dumping position thereof illustrated in phantom lines in FIG. 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A stone gatherer including frame structure, a hollow generally truncated cone-shaped wheel having closed and open major and minor diameter ends, respectively, means journalling said wheel from said frame structure for rolling along the ground surface over which said frame structure is advanced with the axis of rotation of said wheel lying in a substantially vertical plane generally normal to the direction of intended movement of said frame structure and inclined relative to the horizontal an amount substantially equal to the angle of displacement of the slant height of said wheel relative to the wheel center axis with the lowermost slant height of the wheel generally horizontally disposed, means supported from said frame structure for engagement with and laterally deflecting stones lying upon the ground over which said frame structure is advanced into the open end of said wheel, said wheel including circumferentially spaced lift members spaced about the interior thereof for engaging and elevating the rocks deflected into said open end upon rotation of said wheel, said wheel including a body occupying the central portion of the interior thereof, thereby limiting the useful volume to an outer circumferential area of the interior thereof, said lift members being spaced about said outer circumferential area thereof, said body including a plurality of radially outwardly facing relatively angulated sides spaced about said axis and convergent toward said open end, said lift members and body sides being spaced relative to each other about the axis of rotation of said wheel whereby stones within said wheel and engaged and elevated by said lift members will fall from the latter by gravity upon being elevated into an upper portion of said wheel, downwardly onto the uppermost body side for movement downwardly therealong and outwardly of the open side of said wheel.

2. The combination of claim 1 wherein said frame structure includes an inclined chute generally horizontally aligned with the upper periphery of said body at the minor dimension end thereof adjacent the open side of said wheel, said chute being inclined downwardly and outwardly from said upper periphery of said body.

3. The combination of claim 2 wherein the inclination of said chute relative to the horizontal is substantially equal to the inclination of the uppermost of said angulated sides relative to the horizontal.

4. The combination of claim 2 including an elongated fluted driven roll journaled on said frame structure for rotation about a second generally horizontal axis substantially normal to the axis of rotation of said wheel with the upper periphery of said roll spaced outwardly of adjacent of, generally horizontally registered with the lower marginal portion of said chute.

5. The combination of claim 4 wherein said frame structure includes an upwardly opening receptacle disposed immediately on the side of said roll remote from said chute for receiving from the latter rocks engaged by said roll and discharged laterally thereof from the outer side thereof.

6. The combination of claim 5 wherein said receptacle is shiftably supported from said frame structure for movement between an upwardly opening receiving position disposed alongside the outer side of said roll and a rearwardly tilted rearwardly opening dumping position.

7. The combination of claim 1 wherein said frame structure includes a plate member supported therefrom over the rear lower quadrant portion of the open minor diameter end of said wheel, said plate being supported from said frame structure for shifting between limit positions toward and away from the open end of said wheel, and means yieldingly biasing said plate toward its limit position of movement toward said open end of said wheel.

8. The combination of claim 7 wherein said frame structure includes an inclined chute generally horizontally aligned with the upper periphery of said body at the minor dimension end thereof adjacent the open side of said wheel, said chute being inclined downwardly and outwardly from said upper periphery of said body.

9. The combination of claim 8 wherein the inclination of said chute relative to the horizontal is substantially equal to the inclination of the uppermost of said body sides relative to the horizontal.

10. The combination of claim 7 including an elongated fluted driven roll journaled from said structure for rotation about a second generally horizontal axis substantially normal to the axis of rotation of said wheel with the upper periphery of said roll spaced outwardly adjacent and generally horizontally registered with the lower marginal portion of said chute.

11. The combination of claim 10 wherein said frame structure includes an upwardly opening receptacle disposed immediately on the side of said roll remote from said chute for receiving from the latter rocks engaged by said roll and discharged laterally thereof from the outer side thereof.

12. The combination of claim 11 wherein said receptacle is shiftably supported from said frame structure for movement between an upwardly opening receiving position disposed alongside the outer side of said roll and a rearwardly tilted rearwardly opening dumping position.

13. A stone gatherer including frame structure, a hollow wheel having closed and open ends, means journalling said wheel from said frame structure for rolling along the ground surface over which said frame structure is advanced with the axis of rotation of said wheel lying in a substantially vertical plane generally normal to the direction of intended movement of said frame structure, means supported from said frame structure for engagement with and laterally deflecting stones lying upon the ground over which said frame structure is advanced into the open end of said wheel, said wheel including circumferentially spaced lift members spaced about the interior thereof for engaging and elevating the rocks deflected into said open end upon rotation of said wheel, said wheel including a body occupying the central portion of the interior thereof, thereby limiting the useful volume to an outer circumferential area of the interior thereof, said lift members being spaced about said outer circumferential area thereof, said body including a plurality of radially outwardly facing relatively angulated sides spaced about said axis and convergent toward said open end, said lift members and body sides being spaced relative to each other about the axis of rotation of said wheel whereby stones within said wheel and engaged and elevated by said lift members will fall from the latter by gravity, upon being elevated into an upper portion of said wheel, downwardly onto the uppermost body side for movement downwardly therealong and outwardly of the open side of said wheel.

14. The combination of claim 13 wherein said frame structure includes an inclined chute generally horizontally aligned with the upper periphery of said body at the minor dimensions end thereof adjacent the open side of said wheel, said chute being inclined downwardly from said upper periphery of said wheel.

15. The combination of claim 14 including an elongated fluted driven roll journaled from said frame structure for rotation about a second generally horizontal axis substantially normal to the axis of rotation of said wheel with the inner side of the upper periphery of said roll adjacent and generally horizontally registered with the lower marginal portion of said chute.

16. The combination of claim 15 wherein said frame structure includes an upwardly opening receptacle disposed immediately on the side of said roll remote from said chute for receiving from the latter rocks engaged by said roll and discharged laterally thereof from the outer side thereof.

17. The combination of claim 16 wherein said frame structure includes a sub-frame mounted on said frame structure for vertical floating movement relative thereto, said wheel, chute and roll being mounted on said sub-frame.

18. The combination of claim 15 wherein said structure includes a sub-frame mounted on said frame structure for vertical floating movement relative thereto, said wheel, chute and roll being mounted on said sub-frame.

* * * * *